Feb. 23, 1965 C. S. DUNCAN ETAL 3,170,813

METHOD FOR ENCAPSULATING SEMICONDUCTORS

Filed May 19, 1961

WITNESSES:
Bernard R. Gégauf
Thomas J. Flynn

INVENTORS
Charles S. Duncan and
Herbert L. Taylor.
BY
C. L. Menzemer
ATTORNEY

United States Patent Office 3,170,813
Patented Feb. 23, 1965

3,170,813
METHOD FOR ENCAPSULATING SEMICONDUCTORS

Charles S. Duncan, Penn Hills Township, Allegheny County, and Herbert L. Taylor, Murrysville, Pa., assignors to Westinghouse Electric Corporation, East Pittsburgh, Pa., a corporation of Pennsylvania
Filed May 19, 1961, Ser. No. 111,143
4 Claims. (Cl. 117—215)

The present invention relates to a semiconductor device and a method for encapsulating the same.

In the production of semiconductor devices, such as thermoelemenets, it has been desirable to protect the component parts of the devices, particularly the semiconductor thermoelectric material proper, from exposure to and contact with any deleterious media such as oxidizing atmospheres and contamination during operation of the devices and also to obviate vaporization of any component of the semiconductor material at the operating temperature. Heretofore, difficulties have been encountered in suitably coating the semiconductor devices so that the coating forms a gas-tight seal over the device that will endure the temperatures under which the device must operate without flowing, disrupting, or cracking. Methods employed in the prior art to coat these devices such as dipping or painting have been found to be unsatisfactory since the melting point of the coating material must necessarily be lower than the melting point of any component of the semiconductor devce when the device is to be employed at operating temperatures near the melting point of any one of its component parts. As a result, if the operating temperature of the device exceeds the melting point of the coating material it will sag and flow thereby rendering it useless. Further such dip coatings have been excessively thick and their adherence is poor. Overheating of the thermoelectric materials with degradation thereof can result from dipping in a highly heated melt.

The object of the present invention is to provide a method of encapsulating a semiconductor member to effect a thin highly adherent hermetic seal thereon by applying one or more coatings of a refractory material to the surfaces by plasma jet spray.

Another object of the invention is to provide a method of encapsulating a semiconductor member to effect a hermetic seal thereby applying at least one coating of a first refractory material by plasma jet spray to the exposed surfaces of the member, applying a second coating of a second refractory material of a lower melting temperature than the first refractory material to the member and heating the member to a suitable temperature so that the second coating adherently flows over the first coating and closes any voids therein.

Other objects of the invention will in part be obvious, and will in part, appear hereinafter.

For a better understanding of the nature and objects of this invention reference should be had to the following detailed description and drawings in which.

Figure 1:
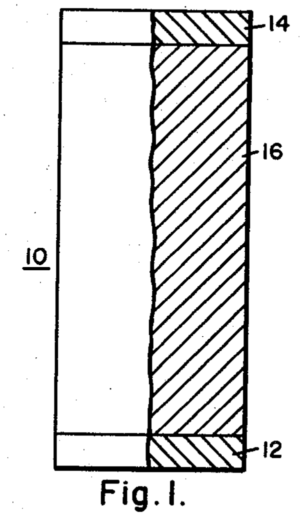
FIG. 1 is a side view shown partially in cross section of a thermoelectric element having hot an cold junction contacts affixed to opposite ends of the element.

In accordance with the present invention and in attainment of the foregoing objects, there is provided a method of encapsulating a semiconductor member with a thin refractory coating highly adherent thereto to effect a hermetic seal therewith. After the surfaces of the member to be coated are cleaned, as by sand blasting or by the use of a solvent, a refractory coating is applied thereon by means of a plasma jet spray. The coating may consist of any sprayable refractory material such as a ceramic or glass which is electrically insulating, thermally compatible with the semiconductor member and resistant to effects of the atmosphere and ambients to which the device is to be subjected.

The refractory particles are heated to a high temperature of over 5000° F., to as much as 20,000° F., by the plasma jet and driven at an extremely high velocity so that the particles are embedded in the thermoelectric material and even into metals and solders or brazing alloys. Uniformly thick coatings of only a mil or two can be applied so as to cover completely the surfaces of the thermoelectric components with a dense, highly adherent layer of refractory. The thermoelectric materials are not degraded or subjected to excessive temperatures since the sprayed coating is thin and cools rapidly, often down to several hundred degrees centigrade in a few seconds.

It is particularly desirable and feasible that a single plasma jet spray coating be applied to the member to effect the desired protective hermetic seal. In order for this to be accomplished, the refractory material selected must have a wide melting point or be a low viscosity fluid over a range of temperatures and must have the ability to flow slightly plastically after it is applied to the member so that a gas-tight seal will be formed on the surfaces of the semiconductor member. Under these conditions, the melting point of the refractory material may be the same as that of the semiconductor material or slightly below depending on the anticipated operating temperature of the device. Coatings as thin as one or two mils which adhere tightly can be applied. This does not preclude the application of coatings up to 10 mils or more in thickness. The thin coatings are relatively flexible and will not crack or fail thermally as will very heavy coatings.

However, in cases where the refractory material will not flow plastically upon contact with the semiconductor member some voids may be present in the plasma jet spray coating, therefore, there will need to be applied a second coating of a refractory material by either plasma jet spray or by other means such as painting or dipping to fill these voids.

In the latter case, a first refractory material having a high melting point near the upper limit of use of the thermoelectric material or even a substantially higher melting point than the semiconductor material itself, is sprayed by plasma jet onto the exposed surfaces of the member to cover the surfaces with a first coating of from about 1 to 10 mils thickness. Then a second coating of another refractory material having a lower melting point than the first refractory material, and preferably slightly below the melting point of the thermoelectric material, is applied by any suitable means such as plasma jet spraying, painting, or dipping. The member is then heated to a temperature above the melting point of the second coating material but below the melting point of the semiconductor member or any one of its component parts. This causes the second material to flow and to close any voids in the first plasma jet sprayed refractory coating. The second coating material is preferably selected so that it fuses to the first coating and chemically combines with it so that the resultant melting temperature of the fused coatings is greater than the melting temperature of the second coating, and can exceed that of the thermoelectric material.

It should be understood that by use of a second coating material which flows plastically upon contact with the first coating so as to fill any voids without subsequent heating, the second coating material may have a higher melting point than the thermoelectric material. Thus, if a high melting point borosilicate glass is employed for the first coating and a lower melting point alkali metal silicate glass is used for the second coating, upon heating the two coatings to the melting point of the second coating a reaction will take place to form an alkali borosilicate glass which will have a much higher melting point than the second coating material. Again, a high silica content (for example 96% silica balance alumina) first coating if covered with a layer of a reactive lower melting temperature calcium aluminate or sodium calcium silicate and heated to the melting temperature of the latter material, will form by reaction with the high silica coating a higher melting point reaction product than the second material. Accordingly, the coating materials are selected to react to give this result. Suitable thicknesses for the first coating are of the order of 0.001 to 0.010 inch and the thickness of the second coating is of the order of 0.0003 to 0.002 inch. Good results have been obtained when the first coating was 0.002 inch and the second coating 0.001 inch thick.

Referring now to the drawings there is shown in FIG. 1 a thermoelectric element 10 with a hot junction contact 12 and a cold junction contact 14 joined to opposite ends of a body 16 of thermoelectric material.

Figure 2:
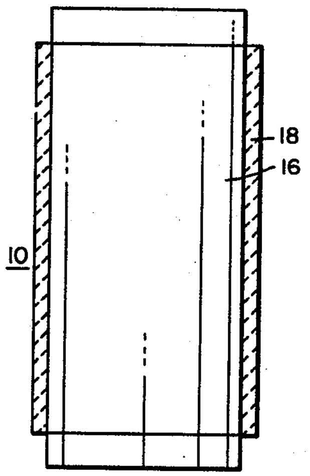
FIG. 2 is a side view shown partially in cross section of a thermoelectric element produced in accordance with the teachings of this invention.

FIG. 2 shows the thermoelectric element 10 after a coating 18 of a refractory material has been applied by plasma jet to the body 16 of thermoelectric material in accordance with the teachings of this invention.

Figure 3:
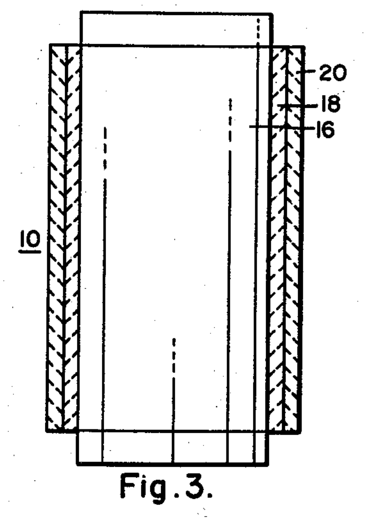
FIG. 3 is a side view shown partially in cross section of a thermoelectric element produced in accordance with the teachings of this invention.

FIG. 3 shows the thermoelectric element 10 after a second coating 20 of a refractory material has been applied over the first coating 18.

Figure 4:
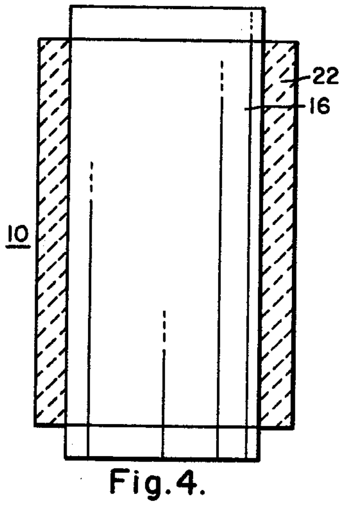
FIG. 4 is a side view shown partially in cross section of a thermoelectric element produced in accordance with the teachings of this invention.

FIG. 4 shows a coating 22 of a refractory material which results from a fusion of coatings 18 and 20 resulting from the heating of the thermoelectric element 10 to the melting point of coating 20.

The following examples are illustrative of the teaching of the invention.

*Example I*

A lead telluride (melting temperature about 1088° C.) thermoelectric element is cleaned by light sand blasting and is coated with a 0.002 inch thick plasma jet sprayed layer of a glass comprising by weight 29.1% lead oxide, 4.8% aluminum oxide, 19.3% boron oxide, 29.1% barium oxide, 9.9% silicon dioxide and 7.8% calcium oxide and having a melting temperature range of from 750° C. to 800° C. A second coating comprising a water suspension of a frit of a refractory glass is painted on top of the first coat. It is approximately one mil thick after drying. The glass for the second coat comprises 3.7% lithium oxide, 22.8% sodium oxide, 20.5% aluminum oxide, 7.2% boron oxide, 1.3% silicon dioxide and 44.5% phosphorus pentoxide. The melting range of the second coat material is from 550° C. to 600° C. The coated element is then heated in a non-oxidizing atmosphere at a temperature of 575° C. for a period of time to allow the second coating material to flow plastically so as to fill the voids in the first coating and also to fuse it to and react it with the first coating. The heated and reacted coatings formed a hermetic layer. The element was then tested and proved to be highly satisfactory at its normal operating temperatures.

The thermoelectric elements are preferably joined, as by brazing, to metal contacts before being treated to apply the plasma jet spray coating of insulating protective material. However, pellets or other thermoelectric material bodies may be coated on their exposed surfaces by plasma jet spraying, and then soldered to suitable contacts at the uncoated areas so as to provide a completely sealed device.

*Example II*

A thermoelectric device comprising pellets of germanium bismuth telluride (P-type) and lead telluride (N-type) brazed to copper straps is plasma jet sprayed with calcium aluminum silicate to provide a coating of several mils thickness covering all the exposed surfaces of the pellets and extending over the edges of the copper straps and covering the brazed joints. Thereafter a second coating of a sodium borosilicate glass (21% $SiO_2$, 42% $B_2O_3$ and 37% NaO) is plasma sprayed to cover the first layer. The coated member is heated for half an hour at 600° C. and the two coatings fuse into a high temperature protective coating. The refractory coating is highly adherent and hermetically seals in the surfaces of the thermoelectric pellets.

*Example III*

A lead telluride pellet brazed to metal electrode terminals is plasma sprayed with a single 3–4 mil thick coating of the following refractory: PbO—29.1%, $Al_2O_3$—4.8%, $B_2O_3$—19.3%, BaO—29.1%, $SiO_2$—9.7%, and CaO—7.8%. The resulting coating is highly adherent and free from voids.

It is intended that the above description be construed as being exemplary and not in limitation of the invention.

We claim as our invention:

1. In a method of encapsulating a semiconductor member to effect a hermetic seal thereby, the steps comprising applying a coating of a first refractory material by plasma jet spray to the exposed surfaces of the member, applying a second coating of a second refractory insulating material on the member, the melting point of said second material being less than the melting point of the first coating and heating the member to a temperature above the melting point of said second coating material so that the second coating flows and adheres to the first coating and closes any voids therein.

2. The process of claim 1, wherein the first coating material and the second coating material react on heating so as to produce a product having a higher melting point than the second material alone, whereby the melting point of the fused coatings is greater than the melting point of the second coating and an improved seal is provided.

3. In a method of encapsulating a semiconductor member to effect a hermetic seal thereby, the steps comprising applying at least one coating of a refractory insulating material by plasma jet spray to the exposed surfaces of the member, the coating being of the order of from 0.001 to 0.01 inch thick and applying a second coating of a refractory material on the member, the coating being of the order of from 0.0003 to .002 inch thick.

4. In a method of encapsulating a semiconductor member to effect a hermetic seal thereby, the steps comprising applying a coating of a first refractory material by plasma jet spray to the exposed surfaces of the member, the coating being of the order of from 0.001 to 0.01 inch thick, applying thereover a second coating of a second refractory insulating material on the member, the melting point of said second material being less than the melting point of the first coating, the second coating being of the order of from 0.0003 to 0.002 inch thick, the second material reacting with the first material on being melted, and heating the member to a suitable temperature above the melting point of said second coating material so that the second coating flows and adheres to the first coating and closes any voids therein whereby the resultant melting point of the fused coatings is greater than the melting point of the second material.

References Cited in the file of this patent

UNITED STATES PATENTS

| | | |
|---|---|---|
| 2,394,591 | Bricker | Feb. 12, 1946 |
| 2,818,354 | Pritikin et al. | Dec. 31, 1957 |
| 2,844,693 | Rigterink | July 22, 1958 |
| 2,961,350 | Flaschen et al. | Nov. 22, 1960 |

OTHER REFERENCES

Popular Mechanics, vol. III, No. 2, February 1959 (page 88 relied on) (copy in Scientific Library).